US010148887B2

(12) United States Patent
Terada et al.

(10) Patent No.: US 10,148,887 B2
(45) Date of Patent: Dec. 4, 2018

(54) IMAGING CONTROL DEVICE (71) Applicant: THINE ELECTRONICS, INC., Tokyo (JP)

(72) Inventors: Toshihiko Terada, Tokyo (JP); Yoichi Tosaka, Tokyo (JP); Tetsuji Uezono, Tokyo (JP); Kazunori Suzuki, Tokyo (JP)

(73) Assignee: THINE ELECTRONICS, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 14/891,696

(22) PCT Filed: Dec. 18, 2014

(86) PCT No.: PCT/JP2014/083589
§ 371 (c)(1),
(2) Date: Nov. 17, 2015

(87) PCT Pub. No.: WO2015/098704
PCT Pub. Date: Jul. 2, 2015

(65) Prior Publication Data
US 2016/0127631 A1 May 5, 2016

(30) Foreign Application Priority Data

Dec. 25, 2013 (JP) .................. 2013-267239

(51) Int. Cl.
H04N 5/235 (2006.01)
G03B 15/05 (2006.01)
(Continued)

(52) U.S. Cl.
CPC ........... H04N 5/2352 (2013.01); G03B 15/05 (2013.01); H04N 5/2256 (2013.01);
(Continued)

(58) Field of Classification Search
CPC ................ H04N 5/235; H04N 5/2351–5/2354
(Continued)

(56) References Cited

U.S. PATENT DOCUMENTS

2005/0213849 A1* 9/2005 Kreang-Arekul ..... G06T 3/4038
382/284
2006/0055800 A1* 3/2006 Ackland ................ H04N 3/155
348/308

(Continued)

FOREIGN PATENT DOCUMENTS

CN 1932630 A 3/2007
CN 101227562 A 7/2008
(Continued)

OTHER PUBLICATIONS

International Preliminary Report on Patentability, dated Jul. 7, 2016 from the International Bureau in counterpart International application No. PCT/JP2014/083589.
(Continued)

Primary Examiner — Anthony J Daniels
(74) Attorney, Agent, or Firm — Sughrue Mion, PLLC (57) ABSTRACT An imaging system 1 includes an imaging control device 10, an imaging device 20, and a light emitting device 30. The imaging control device 10 is provided for controlling the imaging device 20 and the light emitting device 30, and includes an evaluation unit 13, a light reception adjustment unit 14, and a light emission adjustment unit 15. The evaluation unit 13 evaluates respective brightnesses of the first image data and the second image data that are output from the imaging device 20. The light reception adjustment unit 14 adjusts any of an exposure time, a diaphragm value, and a gain that are to be used when the imaging device 20 captures an image, based on a brightness evaluation result. The light emission adjustment unit 15 causes the light emitting device 30 to emit light of either wavelength band of
(Continued)

the first wavelength band and the second wavelength band, and adjusts a light emission intensity of the light, based on an evaluation result.

5 Claims, 5 Drawing Sheets

(51) Int. Cl.
  *H04N 5/243* (2006.01)
  *H04N 5/225* (2006.01)
(52) U.S. Cl.
  CPC ......... *H04N 5/2351* (2013.01); *H04N 5/2353* (2013.01); *H04N 5/243* (2013.01)
(58) Field of Classification Search
  USPC ........ 348/16.1, 222.1, 229.1, 241, 266, 277, 348/366, 362, 370, 371, 376
  See application file for complete search history.

(56) References Cited

U.S. PATENT DOCUMENTS

| | | | |
|---|---|---|---|
| 2009/0065679 A1* | 3/2009 | Tanimoto | H04N 5/33 250/208.1 |
| 2016/0028965 A1* | 1/2016 | Horii | H04N 5/225 348/333.01 |

FOREIGN PATENT DOCUMENTS

| | | |
|---|---|---|
| CN | 101288170 A | 10/2008 |
| CN | 102298452 A | 12/2011 |
| JP | 0273794 A | 3/1990 |
| JP | 2003069865 A | 3/2003 |
| JP | 2004235927 A | 8/2004 |
| JP | 2009066121 A | 4/2009 |
| JP | 4396684 B2 | 1/2010 |
| JP | 2011211497 A | 10/2011 |
| JP | 2012029130 A | 2/2012 |
| JP | 2012129900 A | 7/2012 |
| JP | 2012242948 A | 12/2012 |
| JP | 2013085215 A | 5/2013 |
| TW | 200731796 A | 8/2007 |
| TW | 201043010 A | 12/2010 |

OTHER PUBLICATIONS

International Search Report, issued by International Searching Authority in corresponding International Application No. PCT/JP2014/083589, dated Mar. 31, 2015.

Communication dated Nov. 10, 2017, issued by the Taiwanese Patent Office in Application No. 103145505.

Communication dated Apr. 27, 2018 from the State Intellectual Property Office of the P.R.C. in counterpart Application No. 201480070287.3.

* cited by examiner

Fig. 2

Fig. 5

IMAGING CONTROL DEVICE

CROSS REFERENCE TO RELATED APPLICATIONS

This application is a National Stage of International Application No. PCT/JP2014/083589 filed Dec. 18, 2014, claiming priority based on Japanese Patent Application No. 2013-267239 filed Dec. 25, 2013, the contents of all of which are incorporated herein by reference in their entirety.

TECHNICAL FIELD

The present invention relates to an imaging control device.

BACKGROUND ART

There is known an imaging device that outputs first image data obtained by receiving light of a first wavelength band and capturing an image, and outputs second image data obtained by receiving light of a second wavelength band and capturing an image (refer to PTLs 1 to 3). For example, the first wavelength band is a visible range and the second wavelength band is an infrared range. Such an imaging device includes a light receiving unit in which a plurality of pixels is arranged in an array. Each pixel includes a first light receiving element for receiving light of the first wavelength band and a second light receiving element for receiving light of the second wavelength band. The first light receiving element and the second light receiving element are each provided with an optical filter for selectively transmitting light of a wavelength band to be received.

Such an imaging device has the following applications. By capturing an image of a skin of a human to simultaneously obtain visible range image data and infrared range image data, and obtaining a difference between both of the image data, invisible flecks or wrinkles of the skin can be found. By capturing an image of an intersection scenery to simultaneously obtain visible range image data and infrared range image data, while a color of a signal can be identified based on the visible range image data, a pedestrian, an obstacle, or the like can be detected based on the infrared range image data.

By capturing an image of a scenery including a distant view to simultaneously obtain visible range image data and infrared range image data, and adding the edge components of the infrared range image data to the visible range image data, a distant view image can be sharpened. By obtaining infrared range image data in a dark place, and performing automatic focusing, in-focus visible light image data can be obtained. In addition, by simultaneously obtaining visible range image data and infrared range image data, a color image including a visible range and an infrared range can be obtained.

CITATION LIST

Patent Literature

Patent Literature 1: JP 2013-85215A
Patent Literature 2: JP 4396684B1
Patent Literature 3: JP 2012-242948A

SUMMARY OF INVENTION

Technical Problem

The brightness of image data output from an imaging device can be adjusted by any of an exposure time, a diaphragm value, and a gain. Here, the exposure time refers to a time for which electric charge is generated according to light reception and the electric charge is accumulated. The diaphragm value is a value obtained by dividing a focal distance of a lens by an effective aperture of the lens. In addition, the gain is a ratio between an accumulated electric charge amount and an output voltage value that is used when the accumulated electric charge amount is converted into the output voltage value.

Nevertheless, the respective sensitivities of the first light receiving element and the second light receiving element are generally different from each other. The respective intensities of light of the first wavelength band and light of the second wavelength band that are to be received are accordingly different from each other. In addition, the respective exposure times, diaphragm values, or gains of the first light receiving element and the second light receiving element cannot be individually set. It is therefore difficult to set, for various objects, both of the respective brightnesses of the first image data and the second image data within an appropriate range.

For example, even if the brightness of the first image data is within an appropriate range, many pixels in the second image data may be saturated, or conversely, the second image data may be dark and may have the size approximately equivalent to the size of noise components. In these cases, it becomes difficult to achieve the purposes of the above-described applications.

The present invention has been contrived to solve the above problems, and aims to provide an imaging control device that can set, for various objects, both of the respective brightnesses of the first image data and the second image data that are output from an imaging device, within an appropriate range. In addition, the present invention also aims to provide an imaging system including such an imaging control device and an imaging device.

Solution to Problem

An imaging control device of the present invention is an imaging control device for controlling an imaging device configured to output first image data obtained by receiving light of a first wavelength band and capturing an image, and second image data obtained by receiving light of a second wavelength band and capturing an image, and a light emitting device configured to emit light of the first wavelength band or the second wavelength band. The imaging control device of the present invention includes (1) an evaluation unit configured to evaluate respective brightnesses of the first image data and the second image data that are output from the imaging device, (2) a light reception adjustment unit configured to adjust an exposure time or a gain that is to be used when the imaging device captures an image, based on a brightness evaluation result obtained by the evaluation unit, and (3) a light emission adjustment unit configured to cause the light emitting device to emit light of either wavelength band of the first wavelength band and the second wavelength band, and to adjust a light emission intensity of the light, based on a brightness evaluation result obtained by the evaluation unit. Further, in the imaging control device of the present invention, respective brightness evaluation values of the first image data and the second image data that are obtained by the evaluation unit are adjusted to appropriate values through adjustment of any of an exposure time, a diaphragm value, and a gain of the imaging device by the light reception adjustment unit, and selection of a light emission wavelength band of the light emitting device and adjustment of a light emission intensity by the light emission adjustment unit.

In the imaging control device according to the present invention, the evaluation unit may compare the respective brightness evaluation values of the first image data and the second image data, with a threshold. In this case, the light reception adjustment unit adjusts any of an exposure time, a diaphragm value, and a gain of the imaging device so as to adjust to an appropriate value a brightness evaluation value of image data of a wavelength band, of which a brightness evaluation value obtained by the evaluation unit is larger than the threshold, out of the first image data and the second image data. In addition, the light emission adjustment unit adjusts, so as to adjust to an appropriate value a brightness evaluation value of image data of a wavelength band, of which a brightness evaluation value obtained by the evaluation unit is smaller than the threshold, out of the first image data and the second image data, a light emission intensity in the wavelength band of the light emitting device.

In the imaging control device according to the present invention, the evaluation unit may compare the respective brightness evaluation values of the first image data and the second image data with each other. In this case, the light reception adjustment unit adjusts any of an exposure time, a diaphragm value, and a gain of the imaging device so as to adjust to an appropriate value a brightness evaluation value of image data of a wavelength band, of which a brightness evaluation value obtained by the evaluation unit is larger, out of the first image data and the second image data. In addition, the light emission adjustment unit adjusts, so as to adjust to an appropriate value a brightness evaluation value of image data of a wavelength band, of which a brightness evaluation value obtained by the evaluation unit is smaller, out of the first image data and the second image data, a light emission intensity in the wavelength band of the light emitting device.

In the imaging control device according to the present invention, the light emission adjustment unit may adjust a light emission intensity of the light emitting device so that the number of saturated pixels in image data becomes equal to or smaller than a predetermined percentage.

An imaging system according to the present invention includes (1) an imaging device configured to output first image data obtained by receiving light of a first wavelength band and capturing an image, and second image data obtained by receiving light of a second wavelength band and capturing an image, (2) a light emitting device configured to emit light of either wavelength band of the first wavelength band and the second wavelength band, and (3) the above imaging control device according to the present invention, configured to control the imaging device and the light emitting device.

Advantageous Effects of Invention

According to the present invention, for various objects, the respective brightnesses of the first image data and the second image data that are output from the imaging device can be both set within an appropriate range.

DESCRIPTION OF EMBODIMENTS

An embodiment of the present invention will be described in detail below with reference to the accompanying drawings. In the descriptions of the drawings, the same elements are assigned the same reference numerals, and the redundant descriptions will be omitted.

Figure 1:
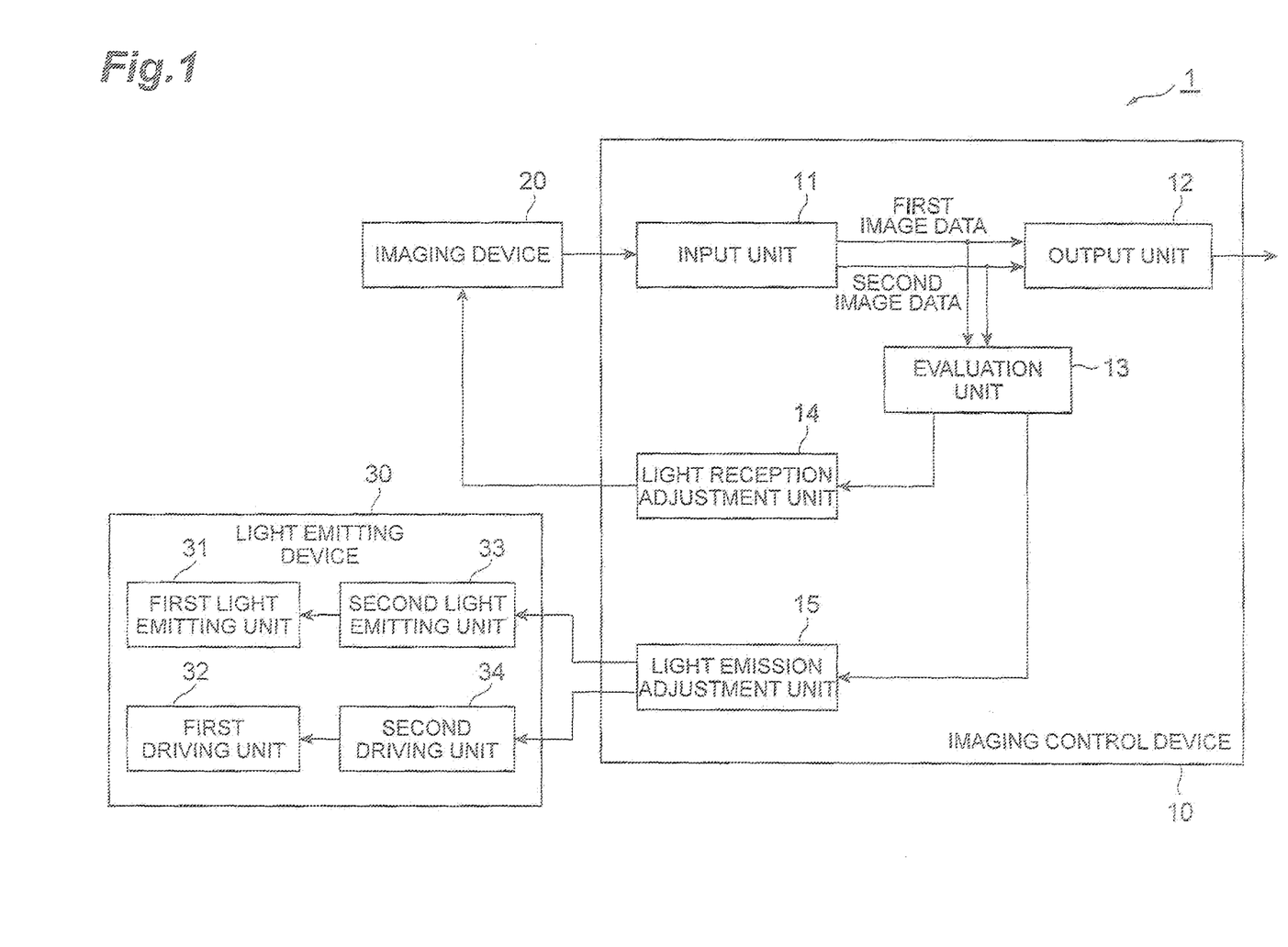
FIG. 1 is a diagram illustrating a configuration of an imaging system 1 including an imaging control device 10 according to the present embodiment.

FIG. 1 is a diagram illustrating a configuration of an imaging system 1 including an imaging control device 10 according to the present embodiment. The imaging system 1 includes the imaging control device 10, an imaging device 20, and a light emitting device 30.

The imaging device 20 outputs first image data obtained by receiving light of a first wavelength band and capturing an image, and outputs second image data obtained by receiving light of a second wavelength band and capturing an image. The imaging device 20 includes a light receiving unit in which a plurality of pixels is arranged in an array. Each pixel includes a first light receiving element for receiving light of the first wavelength band and a second light receiving element for receiving light of the second wavelength band. The first light receiving element and the second light receiving element are each provided with an optical filter for selectively transmitting light of a wavelength band to be received.

The imaging device 20 includes, for example, a charge-coupled device (CCD) sensor or a complementary metal-oxide semiconductor (CMOS) sensor. Any of an exposure time, a diaphragm value, and a gain that are to be used when the imaging device 20 captures an image is variable. The brightness of image data output from the imaging device 20 can be adjusted by any of an exposure time, a diaphragm value, and a gain.

The light emitting device 30 emits light of either wavelength band of the first wavelength band and the second wavelength band. The light emitting device 30 includes a first light emitting unit 31, a second light emitting unit 32, a first driving unit 33, and a second driving unit 34. The first light emitting unit 31 emits light of the first wavelength band. The second light emitting unit 32 emits light of the second wavelength band. The first driving unit 33 drives light emission by the first light emitting unit 31. The second driving unit 34 drives light emission by the second light emitting unit 32.

For example, the first light emitting unit 31 and the second light emitting unit 32 each include a light-emitting diode. The first driving unit 33 can adjust a light emission intensity of the first light emitting unit 31 by adjusting the magnitude of driving current to be applied to the first light emitting unit 31. The second driving unit 34 can adjust a light emission intensity of the second light emitting unit 32 by adjusting the magnitude of driving current to be applied to the second light emitting unit 32.

The first wavelength band and the second wavelength band may be a combination of arbitrary bands such as a visible range, an infrared range, and an ultraviolet range. For example, one of the first wavelength band and the second wavelength band may be a visible range, and the other one of them may be an infrared range. Alternatively, one of them may be a visible range, and the other one of them may be an ultraviolet range. Yet alternatively, one of them may be a short wavelength range in a visible range, and the other one of them may be a long wavelength range in a visible range. Yet alternatively, one of them may be a near-infrared range, and the other one of them may be a mid-infrared range.

The first wavelength band and the second wavelength band may partially include a common band. The first wavelength band or the second wavelength band may include a plurality of partial bands, and may be, for example, a visible range including respective partial bands of red (R), green (G), and blue (B).

The imaging control device 10 is provided for controlling the imaging device 20 and the light emitting device 30. The imaging control device 10 includes an input unit 11, an output unit 12, an evaluation unit 13, a light reception adjustment unit 14, and a light emission adjustment unit 15.

The input unit 11 inputs the first image data and the second image data that are output from the imaging device 20. The first image data and second image data that are output from the imaging device 20 and input to the input unit 11 may be transmitted via separate signal lines, or may be transmitted via a common signal line. In the latter case, the first image data and the second image data are time-divisionally transmitted from the imaging device 20 to the input unit 11 via a common signal line, and are separated from each other by the input unit 11.

The output unit 12 outputs the first image data and the second image data that are output from the input unit 11, to the outside of the imaging control device 10. The output unit 12 may time-divisionally output the first image data and the second image data to a common output signal line. In addition, the input unit 11 or the output unit 12 may perform image processing on both or either one of the first image data and the second image data.

The evaluation unit 13 evaluates the respective brightnesses of the first image data and the second image data that are output from the imaging device 20 and input to the input unit 11. The brightness evaluation value obtained by the evaluation unit 13 may be, for example, the average value of all pixel data. In addition, if the first wavelength band or the second wavelength band is a visible range including the respective partial bands of RGB, the brightness evaluation value obtained by the evaluation unit 13 may be, for example, the average value of luminance values calculated from the respective data of RGB of all pixels.

The light reception adjustment unit 14 adjusts any of an exposure time, a diaphragm value, and a gain that are to be used when the imaging device 20 captures an image, based on the brightness evaluation result obtained by the evaluation unit 13. The light reception adjustment unit 14 may adjust any one of the exposure time, the diaphragm value, and the gain, may adjust any two of them, or may adjust all of them.

The light emission adjustment unit 15 causes the light emitting device 30 to emit light of either wavelength band of the first wavelength band and the second wavelength band, and adjusts the light emission intensity of the light, based on the brightness evaluation result obtained by the evaluation unit 13. When causing the light emitting device 30 to emit light of the first wavelength band, the light emission adjustment unit 15 issues an instruction to the first driving unit 33. Upon receiving the instruction, the first driving unit 33 drives the first light emitting unit 31 to emit light of the first wavelength band at a designated intensity. Similarly, when causing the light emitting device 30 to emit light of the second wavelength band, the light emission adjustment unit 15 issues an instruction to the second driving unit 34. Upon receiving the instruction, the second driving unit 34 drives the second light emitting unit 32 to emit light of the second wavelength band at a designated intensity.

The respective brightness evaluation values of the first image data and the second image data that are obtained by the evaluation unit 13 are adjusted to appropriate values through the adjustment of any of the exposure time, the diaphragm value, and the gain of the imaging device 20 by the light reception adjustment unit 14, and the selection of the light emission wavelength band of the light emitting device 30 and the adjustment of the light emission intensity by the light emission adjustment unit 15.

There can be various modes of the evaluation of the respective brightnesses of the first image data and the second image data by the evaluation unit 13, the adjustment of any of the exposure time, the diaphragm value, and the gain of the imaging device 20 by the light reception adjustment unit 14, and the selection of the light emission wavelength band of the light emitting device 30 and the adjustment of the light emission intensity by the light emission adjustment unit 15.

For example, the evaluation unit 13 may compare the respective brightness evaluation values of the first image data and the second image data, with a threshold. At this time, the light reception adjustment unit 14 adjusts the exposure time or the gain of the imaging device 20 so as to adjust to an appropriate value the brightness evaluation value of image data of a wavelength band, of which the brightness evaluation value obtained by the evaluation unit 13 is larger than the threshold, out of the first image data and the second image data. The light emission adjustment unit 15 adjusts, so as to adjust to an appropriate value the brightness evaluation value of image data of a wavelength band, of which the brightness evaluation value obtained by the evaluation unit 13 is smaller than the threshold, out of the first image data and the second image data, the light emission intensity in the wavelength band of the light emitting device 30.

In addition, the evaluation unit 13 may compare the respective brightness evaluation values of the first image data and the second image data with each other. At this time, the light reception adjustment unit 14 adjusts the exposure time or the gain of the imaging device 20 so as to adjust to an appropriate value the brightness evaluation value of image data of a wavelength band, of which the brightness evaluation value obtained by the evaluation unit 13 is larger, out of the first image data and the second image data. The light emission adjustment unit 15 adjusts, so as to adjust to an appropriate value the brightness evaluation value of image data of a wavelength band, of which the brightness evaluation value obtained by the evaluation unit 13 is smaller, out of the first image data and the second image data, the light emission intensity in the wavelength band of the light emitting device 30.

In addition, when a light amount is insufficient whichever of the exposure time, the diaphragm value, and the gain of the imaging device 20 is adjusted by the light reception adjustment unit 14, as in a very dark environment, the evaluation unit 13 may adjust the light emission amount in a wavelength band on the side of the light reception adjustment by the light emission adjustment unit 15. In addition, the evaluation unit 13 may simultaneously adjust both light emitting elements of the respective wavelength bands on the light reception adjustment side and the light emission adjustment side.

In addition, the light emission adjustment unit 15 may adjust the light emission intensity of the light emitting device 30 so that the number of saturated pixels in image data becomes equal to or smaller than a predetermined percentage.

According to the present embodiment, for various objects, the respective brightnesses of the first image data and the second image data that are output from the imaging device 20 can be both set within an appropriate range.

FIGS. 2 to 5 are flowcharts each illustrating an example of an example of an operation of the imaging control device 10 according to the present embodiment.

Figure 2:
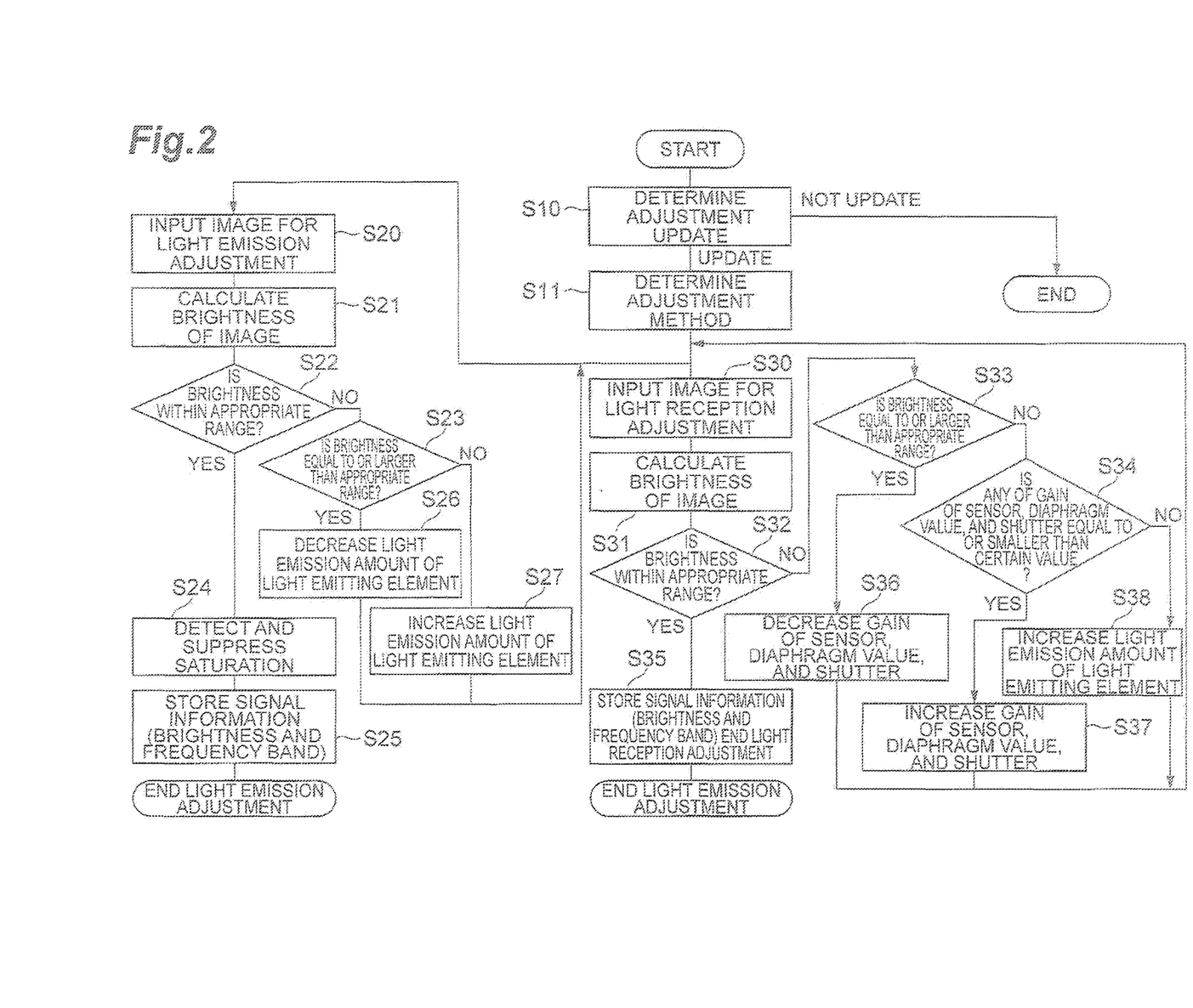
FIG. 2 is a flowchart illustrating an example of an operation of the imaging control device 10 according to the present embodiment.

As illustrated in FIG. 2, in step S10, after inputting the first image data and the second image data, the evaluation unit 13 first determines, based on these data, whether any of the following processes is to be performed. More specifically, the possible processes include the adjustment of any of the exposure time, the diaphragm value, and the gain of the imaging device 20 by the light reception adjustment unit 14, and the selection of the light emission wavelength band of the light emitting device 30 and the adjustment of the light emission intensity by the light emission adjustment unit 15. If it is determined in step S10 that any of these processes is to be performed, the processing proceeds to step S11. If not, the processing ends.

In step S11, the evaluation unit 13 determines which of the processes is to be performed. If it is determined in step S11 that the adjustment of any of the exposure time, the diaphragm value, and the gain of the imaging device 20 by the light reception adjustment unit 14 is to be performed, the processing proceeds to step S30. If it is determined in step S11 that the selection of the light emission wavelength band of the light emitting device 30 and the adjustment of the light emission intensity by the light emission adjustment unit 15 is to be performed, the processing proceeds to step S20.

In step S20, the evaluation unit 13 inputs image data for light emission adjustment (either of the first image data and the second image data), on which the selection of the light emission wavelength band of the light emitting device 30 and the adjustment of the light emission intensity by the light emission adjustment unit 15 is to be performed. In subsequent step S21, the evaluation unit 13 calculates the brightness of the image data for light emission adjustment. In step S22, the evaluation unit 13 determines whether or not the brightness of the image data for light emission adjustment is within an appropriate range. In addition, in step S23, the evaluation unit 13 determines whether the brightness of the image data for light emission adjustment is larger or smaller than the appropriate range.

If it is determined in step S22 that the brightness of the image data for light emission adjustment is within the appropriate range, in step S24, the evaluation unit 13 detects the degree of saturation of the image data for light emission adjustment, and if the degree of saturation is large, the evaluation unit 13 performs a process for suppressing the saturation. In subsequent step S25, the evaluation unit 13 stores the wavelength band and the brightness of the image data for light emission adjustment, and then, the light emission adjustment process ends.

If it is determined in step S23 that the brightness of the image data for light emission adjustment is larger than the appropriate range, in step S26, the light emission adjustment unit 15 decreases the light emission amount in the wavelength band. If it is determined in step S23 that the brightness of the image data for light emission adjustment is smaller than the appropriate range, in step S27, the light emission adjustment unit 15 increases the light emission amount in the wavelength band. After steps S26 or S27, the processing returns to step S20, and the above processes are repeated until the brightness of the image data for light emission adjustment falls within the appropriate range.

In step S30, the evaluation unit 13 inputs image data for light reception adjustment (either of the first image data and the second image data), on which the adjustment of the exposure time or the gain of the imaging device 20 by the light reception adjustment unit 14 is to be performed. In subsequent step S31, the evaluation unit 13 calculates the brightness of the image data for light reception adjustment. In step S32, the evaluation unit 13 determines whether or not the brightness of the image data for light reception adjustment is within an appropriate range. In addition, in step S33, the evaluation unit 13 determines whether the brightness of the image data for light reception adjustment is larger or smaller than the appropriate range.

If it is determined in step S32 that the brightness of the image data for light reception adjustment is within the appropriate range, in step S35, the evaluation unit 13 stores the wavelength band and the brightness of the image data for light reception adjustment, and the light reception adjustment process ends.

If it is determined in step S33 that the brightness of the image data for light reception adjustment is larger than the appropriate range, in step S36, the light reception adjustment unit 14 shortens the exposure time of the imaging device 20, increases the diaphragm value thereof, or decreases the gain thereof. If it is determined in step S33 that the brightness of the image data for light reception adjustment is smaller than the appropriate range, in step S34, it is determined whether the gain of a sensor, a shutter, and the diaphragm value are larger or smaller than a certain value. If it is determined in step S34 that the gain of the sensor and the shutter are smaller than a certain value, and the diaphragm value is equal to or larger than a certain value, in step S37, the light reception adjustment unit 14 prolongs the exposure time of the imaging device 20, decreases the diaphragm value thereof, or increases the gain thereof. If it is determined in step S34 that the gain of the sensor and the shutter are larger than a certain value, and the diaphragm value is equal to or smaller than a certain value, in step S38, the light emission adjustment unit 15 increases the light emission amount of a light emitting element in a wavelength band on the light reception adjustment side. After steps S36 or S37, the processing returns to step S30, and the above processes are repeated until the brightness of the image data for light reception adjustment falls within the appropriate range.

Figure 3:
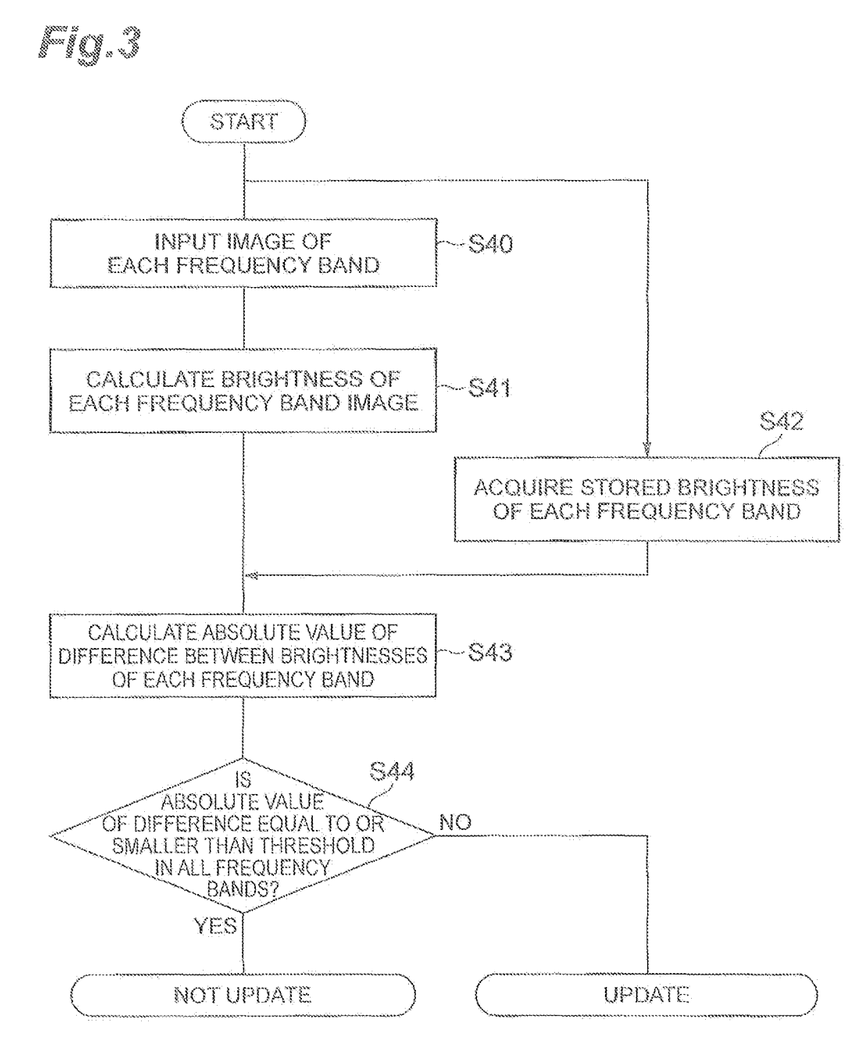
FIG. 3 is a flowchart illustrating an example of an operation of the imaging control device 10 according to the present embodiment.

The determination in step S10 in FIG. 2 is performed through the procedure illustrated in FIG. 3. In step S40, the evaluation unit 13 inputs the first image data and the second image data. In step S41, the evaluation unit 13 calculates the respective brightnesses of the first image data and the second image data. In step S42, the evaluation unit 13 acquires the stored brightnesses of each wavelength band. The brightness acquired in step S42 is the brightness stored in step S25 or S35.

In step S43, the evaluation unit 13 calculates the difference (an absolute value) between the calculated brightness and the stored brightness of each wavelength band. Then, the evaluation unit 13 determines whether or not the difference between the calculated brightness and the stored brightness is equal to or smaller than a threshold in all wavelength bands. If so, the processing ends. In contrast, the difference between the calculated brightness and the stored brightness is larger than the threshold in any wavelength band, the processing proceeds to step S11.

Figure 4:
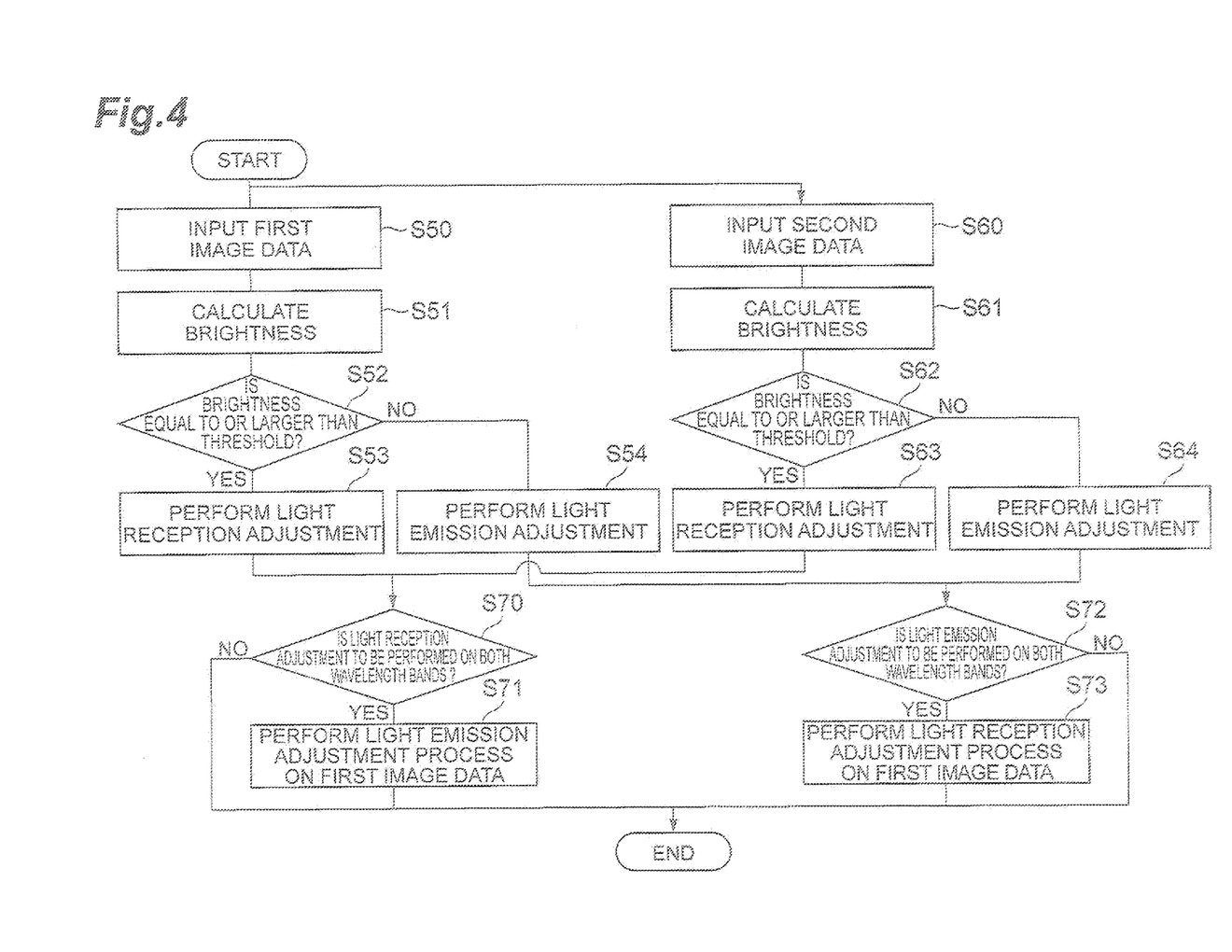
FIG. 4 is a flowchart illustrating an example of an operation of the imaging control device 10 according to the present embodiment.

The determination in step S11 in FIG. 2 is performed through the procedure illustrated in FIG. 4. In step S50, the evaluation unit 13 inputs the first image data. In step S51, the evaluation unit 13 calculates the brightness of the first image data. In step S52, the evaluation unit 13 determines whether or not the brightness of the first image data is equal to or larger than a threshold. Then, if the brightness of the first image data is equal to or larger than the threshold, in step S53, the evaluation unit 13 determines that the light reception adjustment process is to be performed on the first wavelength band. If not, in step S54, the evaluation unit 13 determines that the light emission adjustment process is to be performed on the first wavelength band.

In addition, in step S60, the evaluation unit 13 inputs the second image data. In step S61, the evaluation unit 13 calculates the brightness of the second image data. In step S62, the evaluation unit 13 determines whether or not the brightness of the second image data is equal to or larger than a threshold. Then, if the brightness of the second image data is equal to or larger than the threshold, in step S63, the evaluation unit 13 determines that the light reception adjustment process is to be performed on the second wavelength band. If not, in step S64, the evaluation unit 13 determines that the light emission adjustment process is to be performed on the second wavelength band.

After step S53 or S63, if it is determined in step S70 that the light reception adjustment process is to be performed on both of the first wavelength band and the second wavelength band, in step S71, the evaluation unit 13 determines that the light emission adjustment process is also performed on the first wavelength band. In addition, after step S54 or S64, if it is determined in step S72 that the light emission adjustment process is to be performed on both of the first wavelength band and the second wavelength band, in step S73, the evaluation unit 13 determines that the light reception adjustment process is also performed on the first wavelength band. Through these determination processes, the processing proceeds to step S20 or S30.

Figure 5:
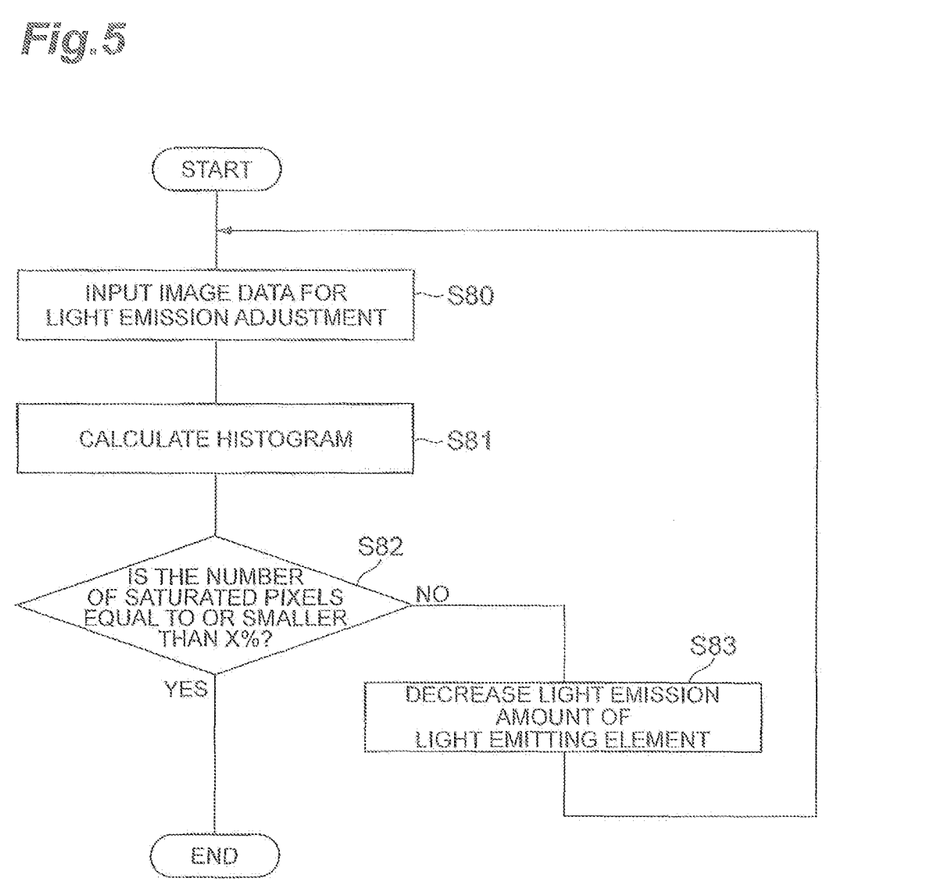
FIG. 5 is a flowchart illustrating an example of an operation of the imaging control device 10 according to the present embodiment.

The detection of the degree of saturation of the image data for light emission adjustment and the process for suppressing the saturation in step S24 in FIG. 2 are performed through the procedure illustrated in FIG. 5. In step S80, the evaluation unit 13 inputs the image data for light emission adjustment. In step S81, the evaluation unit 13 obtains a histogram of each pixel data of the image data for light emission adjustment. In step S82, the evaluation unit 13 determines whether or not the number of saturated pixels is equal to or smaller than a predetermined percentage (x%). If the number of saturated pixels is larger than the predetermined percentage, in step S83, the light emission adjustment unit 15 decreases the light emission amount of the light emitting device 30. Then, the processing returns to step S80, and the above processes are repeated until the number of saturated pixels becomes equal to or smaller than the predetermined percentage (x%). If the number of saturated pixels becomes equal to or smaller than the predetermined percentage (x%), the processing proceeds to step S25.

The present invention is not limited ti the above embodiment, and various modifications can be made. Each of the operations of the imaging control device 10 according to the present embodiment described with reference to FIGS. 2 to 5 is an example. There can be various modes of an operation of the imaging control device 10 according to the present embodiment.

INDUSTRIAL APPLICABILITY

The present invention can be applied to an imaging control device and an imaging system that can set, for various objects, both of the respective brightnesses of the first image data and the second image data that are output from the imaging device, within an appropriate range.

REFERENCE SIGNS LIST 1 imaging system
10 imaging control device
11 input unit
12 output unit
13 evaluation unit
14 light reception adjustment unit.
15 light emission adjustment unit
20 imaging device
30 light emitting device
31 first light emitting unit
32 second light emitting unit
33 first driving unit
34 second driving unit

The invention claimed is:
1. An imaging control device for controlling
a light emitting device configured to emit light of a first wavelength band or a second wavelength band and
an imaging device comprising:
an array of pixels, wherein each of the pixels includes:
a first light receiving element that receives light of a first wavelength band, and
a second light receiving element that receives light of a second wavelength band,
the imaging device being configured to output:
first image data obtained by receiving light of the first wavelength band and capturing an image by the first receiving element, and
second image data obtained by receiving light of the second wavelength band and capturing an image by the second receiving element,
wherein the first image data and second image data are obtained simultaneously;
the imaging control device comprising:
an evaluation unit configured to evaluate respective brightnesses of the first image data and the second image data and obtain a brightness evaluation result;
a light reception adjustment unit configured to adjust an exposure time, a diaphragm value, or a gain that are to be used when the imaging device captures an image based on the brightness evaluation result; and
a light emission adjustment unit configured to cause the light emitting device to emit light of either the first wavelength band or the second wavelength band and to adjust a light emission intensity of the light based on the brightness evaluation result,
wherein the evaluation unit is configured to:
calculate a first difference corresponding to a difference between the brightness of the first image data and a first stored brightness,
calculate a second difference corresponding to a difference between the brightness of the second image data and a second stored brightness, and determine whether the brightness of either the first image data or the second image data is greater than or equal to a range, wherein, if the first difference or the second difference is greater than a threshold, the light reception adjustment unit adjusts at least one of: an exposure time, a diaphragm value, and a gain of the imaging device based on whether the brightness of either the first image data or the second image data is greater than or equal to the range.

2. The imaging control device according to claim 1, wherein the evaluation unit compares the brightness of the first image data with a threshold and the brightness of the second image data with a threshold, wherein the light reception adjustment unit performs light reception adjustment on the first wavelength band if the brightness of the first image data is greater than or equal to the threshold and performs light reception adjustment on the second wavelength if the brightness of the second image data is greater than or equal to the threshold, and wherein the light emission adjustment unit performs light emission adjustment on the first wavelength band if the brightness of the first image data is smaller than the threshold and performs light emission adjustment on the second wavelength band if the brightness of the second image data is smaller than the threshold.

3. The imaging control device according to claim 1, wherein the evaluation unit compares the respective brightness evaluation values of the first image data and the second image data with each other, wherein the light reception adjustment unit adjusts an exposure time or a gain of the imaging device so as to adjust to an appropriate value a brightness evaluation value of image data of a wavelength band, of which a brightness evaluation value obtained by the evaluation unit is larger, out of the first image data and the second image data, and wherein the light emission adjustment unit adjusts, so as to adjust to an appropriate value a brightness evaluation value of image data of a wavelength band, of which a brightness evaluation value obtained by the evaluation unit is smaller, out of the first image data and the second image data, a light emission intensity in the wavelength band of the light emitting device.

4. The imaging control device according to claim 1, wherein the light emission adjustment unit adjusts a light emission intensity of the light emitting device so that the number of saturated pixels in image data becomes equal to or smaller than a predetermined percentage.

5. An imaging system comprising:

an imaging device configured to output first image data obtained by receiving light of a first wavelength band and capturing an image and second image data obtained by receiving light of a second wavelength band and capturing an image;

a light emitting device configured to emit light of either the first wavelength band or the second wavelength band; and the imaging control device according to claim 1.

* * * * *